United States Patent [19]

Glachet et al.

[11] Patent Number: 4,493,598
[45] Date of Patent: Jan. 15, 1985

[54] MASTER-SLAVE TYPE TELESCOPIC TELEMANIPULATOR

[75] Inventors: Charles Glachet; Daniel Francois, both of Vendome; Jean Tentélier, Moree; Christian Frióux, Vendome, all of France

[73] Assignees: La Calhene, Benzons; Commissariat a l'Energie Atomique, Paris, both of France

[21] Appl. No.: 458,886

[22] Filed: Jan. 18, 1983

[30] Foreign Application Priority Data

Jan. 19, 1982 [FR] France .............................. 82 00734

[51] Int. Cl.³ .............................................. B25J 3/00
[52] U.S. Cl. .................................. 414/1; 414/4; 414/7; 901/48
[58] Field of Search ............... 414/1, 4, 7, 8, 719; 901/2–5, 8, 48, 50

[56] References Cited

U.S. PATENT DOCUMENTS 3,391,801 7/1968 Haaker .................................. 414/7
3,890,552 6/1975 Devol et al. ......................... 901/8 X

FOREIGN PATENT DOCUMENTS 2067308 8/1971 France .

*Primary Examiner*—Robert J. Spar
*Assistant Examiner*—Donald W. Underwood
*Attorney, Agent, or Firm*—Pearne, Gordon, Sessions, McCoy, Granger & Tilberry

[57] ABSTRACT

A telescopic telemanipulator of the master-slave type, wherein the slave arm is equilibrated by means of at least one counterweight mounted on a link articulated to the traversing block on the master arm side, the counterweight moving along the link when an offsetting is introduced between the length of the slave arm and that of the master arm; at least a second counterweight is mounted adjacent the first counterweight on another link, such counterweight moving along the link when a variation in the length of the slave arm is controlled from the master arm.

The telemanipulator has application for the remote-controlled handling, among other things, of radioactive products.

8 Claims, 5 Drawing Figures

MASTER-SLAVE TYPE TELESCOPIC TELEMANIPULATOR

The invention relates to a master-slave type telescopic telemanipulator and more particularly, in a telemanipulator of the kind specified, to the devices enabling the arms to be permanently equilibrated.

BACKGROUND OF THE INVENTION

Master-slave type telemanipulators are of course made up of a master arm, having a control handle accessible to an operator, and a slave arm which is generally identical or similar to the master arm and has a tool, such as gripping tongs. The slave arm is disposed inside a cell which is inaccessible to people, because of the presence of a dangerous atmosphere or dangerous products, such as radioactive products, inside the cell. The master arm and the slave arm have the same number of degrees of freedom and are connected mechanically through the wall of the cell, so that any movement of the master arm and/or its control handle initiated by the operator causes an identical or similar movement of the slave arm and/or the gripping tongs. An observation window in the compartment of the cell therefore enables the operator to perform the required handling inside the cell.

Master-slave telemanipulators are also subdivided into two main families. The first of the families contains articulated telemanipulators in which the master and slave arms are each made up of a number of articulated segments which reproduce movements comparable to those of the human arm; most frequently two segments are provided. The second of these families, which is the only one to which the present invention relates, contains telescopic telemanipulators in which each arm is made up of a number of segments telescopically mounted so as to enable the length of the arm to be modified.

More precisely, master-slave type telescopic telemanipulators according to the invention are made up of a telescopic master arm and a telescopic slave arm, such arms being articulated to a traversing block around two normally parallel shoulder pivots which are orthogonal to the axis of the block, the traversing block traversing the compartment of the cell and being mounted to rotate around its own axis. The end of each of the arms therefore has three degrees of positioning freedom, to which are added the degrees of freedom of the control handle and of the tongs, which are mentioned here merely as a reminder, since they do not affect the equilibration of the arms. Conventionally in the following description the degrees of freedom bound up with the positioning of each of the arms will be referred to as follows:

X: rotation of the arms around the axis of the traversing block;
Y: rotation of the arms around their shoulder pivots;
Z: variation in the length of the arms.

To extend the range of telemanipulators and make access to certain zones of the cell easier, as a rule such telemanipulators have means enabling the slave arm to be offset in relation to the master arm in accordance with one or more of the degrees of freedom X, Y and Z, independently of any movement of the master arm.

For various reasons, more particularly to do with the space occupied by the equilibrating counterweights and the need to estimate the number of mechanisms disposed inside the cell to that strictly necessary, having regard to handling difficulties inside the cell, the means for equilibrating the slave arm are disposed, like those of the master arm, outside the cell. However, the equilibration of the slave arm is of course made particularly complex by the possibility of its becoming offset in relation to the master arm in accordance with one or more of the degrees of freedom X, Y and Z, combined with the need to dispose all the equilibrating means outside the cell.

Up to date two master-slave telescopic telemanipulators are known in which the slave arm is equilibrated by two practically opposite techniques.

Thus, in the first known telemanipulator of this kind, a link bearing a first counterweight is retained always parallel with the slave arm when there is no offsetting in X between the master and slave arms. Moreover, the counterweight which ensures the equilibration of the master arm when its length Z varies, at the same time equilibrates the slave arm correspondingly. However, the slave arm is no longer correctly equilibrated by the first counterweight when there is an offsetting in X or Z between the two arms. Moreover, the equilibration in Z of the slave arm by the second counterweight is unsatisfactory, since the corresponding mass becomes parasitic when there is an offsetting in X or Y of the slave arm, all the more so since the latter thus approaches the horizontal. Such defects in equilibration are very troublesome to the operator and make the operation of that telemanipulator particularly difficult.

The second master-slave type telescopic telemanipulator hitherto known in contrast ensures the perfect equilibration of the slave arm in all its positions, whatever offsettings may be introduced between the slave and master arms. However, this result is based on a very complex mechanism which makes the telemanipulator relatively unreliable and above all very substantially increases its price. Moreover, the telemanipulator comprises a counterweight mounted directly on the slave arm in order to compensate its movement in Z; this is undesirable for the reasons of accessibility already stated, and also because this type of mobile counterweight directly mounted on the arm correspondingly increases the mass of the counterweight, which moreover serves to equilibrate the arm assembly.

It is an object of the invention to provide a master-slave type telescopic telemanipulator which equilibrates the slave arm substantially more satisfactorily than the first-mentioned prior art type of telemanipulator and which costs less and is substantially more reliable than the second-mentioned prior art type of telemanipulator.

BRIEF SUMMARY OF THE INVENTION

To this end the invention provides a telescopic telemanipulator comprising: a traversing block which traverses a compartment and which is mounted to rotate around its own axis; a telescopic master arm and a telescopic slave arm, such arms being articulated to the traversing block around two shoulder pivots orthogonal to the axis of the block; a control handle mounted at the free end of the master arm; a gripper member mounted at the free end of the slave arm; means for transmitting to the slave arm and the gripper member movements imparted to the master arm and the control handle; means for offsetting the slave arm in relation to the master arm, enabling the length and orientation of the slave arm around its shoulder pivot to be modified without modifying the corresponding coordinates of the master arm; and means for equilibrating the master arm and means for equilibrating the slave arm, the latter means comprising at least one counterweight mounted on a link articulated to the traversing block on the master arm side and in the opposite direction in relation thereto, around a pivot parallel with or coinciding with the shoulder pivot of the master arm, wherein the means for equilibrating the slave arm comprise at least a first counterweight mounted on a first link, and means for displacing the counterweight along such link, such means being controlled, simultaneously with the lengthwise offsetting of the slave arm in relation to the master arm, by the corresponding offsetting means, and at least a second counterweight mounted on a second link and means for displacing the second counterweight along the second link, these means being controlled by said means for transmitting to the slave arm any modification in the length of the master arm.

In accordance with its characteristics, the telemanipulator according to the invention is very simple mechanically, since it consists in disposing each counterweight serving to compensate the variations in length of the slave arm, in a mobile manner on links articulated upwards to the traversing block, on the master arm side.

This arrangement is particularly advantageous, since it enables the slave arm to be equilibrated and the variations in its length to be compensated by means of the same counterweights. As a result, the mass of the counterweights is substantially reduced in comparison with the prior art telemanipulators which perform these two functions simultaneously.

For technical reasons which are easy to understand (the mass to be equilibrated being not the same), the counterweights serving to compensate any variation in the length of the slave arm resulting from a variation in the length of the master arm are different from those used for compensating a variation in the length of the slave arm corresponding to an offsetting of the slave arm in relation to the master arm. From this aspect, it should be noted that the second compensation (offsetting in Z) is more important than the first one (movement Z).

According to another feature of the invention, means for offsetting the slave arm in relation to the master arm around the axis of the traversing block are also provided for, these means being disposed on the master arm side and acting between a first part of the traversing block, bearing the shoulder pivot of the master arm, and a second part of the traversing block, bearing the shoulder pivot of the slave arm, the link bearing the first counterweight being articulated to the second part, and the link bearing the second counterweight being articulated to the first part. In this way the mobile counterweights are disposed as close as possible to the corresponding members serving to control the variations in length of the slave arm.

Preferably, the telemanipulator also comprises means for pivoting the link around its axis by an angle equal to and in the same direction as the pivoting angle of the slave arm around its shoulder pivot when the transmission means and the offsetting means act on the slave arm to pivot it around its shoulder pivot, the means for pivoting the link ensuring in return the transmission to the slave arm of the equilibrating effect caused by said counterweights.

According to a secondary characteristic of the invention, the means for transmitting to the slave arm a pivoting movement of the master arm around its shoulder pivot comprise a rotary shaft received in the traversing block and rotated by a toothed sector formed on a member mounted to rotate on the shoulder pivot of the master arm, such member being connected to the master arm via the means for controlling the angular offsetting of the slave arm around its shoulder pivot.

Preferably, the link bearing the second counterweight is articulated around an axis coinciding with the shoulder pivot of the master arm, the means for pivoting the link bearing the second counter arm comprising a pivot connected to the link and said member mounted to rotate on the shoulder pivot of the master arm, the means for pivoting the link bearing the first counterweight comprising a tie-rod articulated simultaneously to the link and to a lever arm formed on such member.

According to another feature of the invention, said means for transmitting to the slave arm any modification in the length of the master arm comprise a rotary shaft received in the traversing block, this rotary shaft controlling directly said means for displacing the second counterweight along the second link.

Preferably, the rotary shaft serving to transmit to the slave arm any modification in the length of the master arm controls the displacement of the second counterweight along the link via the agency of a second transmission, of the gear wheel and chain type, between such shaft and the pivot via which the link is articulated to the traversing block, and the means for displacing the second counterweight along the link.

In a comparable manner, the means for the lengthwise offsetting of the slave arm comprise a step-down gearing mounted on the traversing block on the master arm side, the step-down gearing simultaneously controlling the lengthwise offsetting of the slave arm via the agency of a rotary shaft received in such block and the displacement of the first counterweight along the link via the agency of a first transmission, of the gear wheel and chain type, between the step-down gearing and the pivot of articulation of the link to the traversing block, and the means for displacing the first counterweight along the link.

DESCRIPTION OF DRAWINGS

A preferred embodiment of the invention will now be described by way of non-limitativity of example, with reference to the accompanying drawings, wherein.

DETAILED DESCRIPTION OF THE PREFERRED EMBODIMENTS

Figure 1:
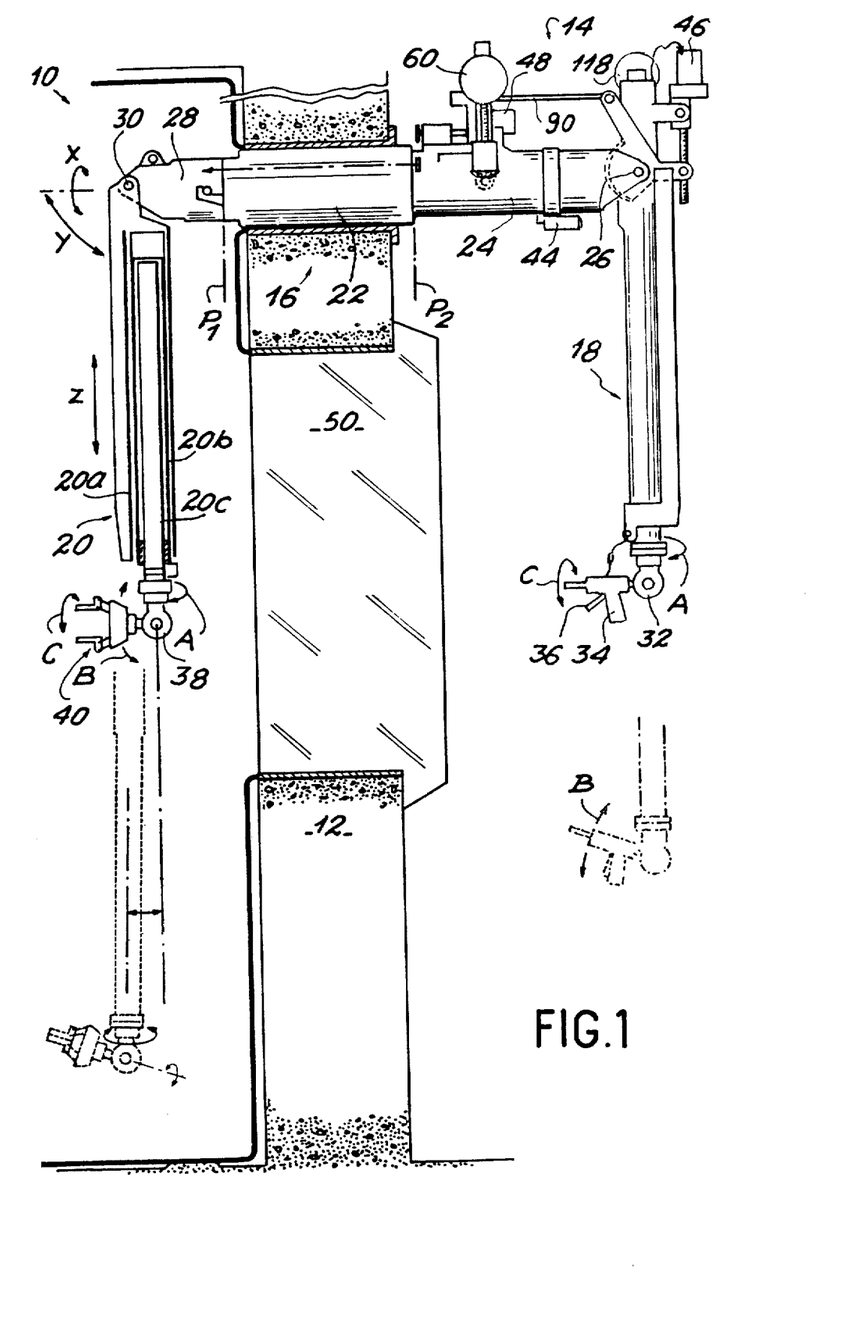
FIG. 1 is a partially sectioned side elevation diagrammatically illustrating a master-slave type telescopic manipulator according to the invention.

FIG. 1 shows a vertical compartment 12 of a cell 10 containing an atmosphere or products which must be isolated, as a result of their dangerous nature, or the need to give them environmental protection. The cell 10 can contain inter alia radioactive products.

When handling is to be performed in such a cell, it must be remote-controlled from outside, telemanipulators being used for this purpose. Preferably an observation window 50 is made in the compartment 12 to enable the operator to observe the handling process directly. Under certain conditions the observation window 50 might be entirely eliminated, and replaced by an electronic assembly comprising one or more television cameras disposed inside the cell and connected to screens disposed outside the cell.

According to the invention a master-slave telescopic telemanipulator 14 is used comprising a traversing block 16 which traverses the compartment 12 and to the ends of which are articulated, outside the cell 10, a telescopic master arm 18 and, inside the cell 10, a telescopic slave arm 20.

More precisely, the traversing block 16 comprises a cylindrical part 22 mounted to rotate in the compartment 12 around its horizontal axis, an overhung part 24 disposed outside the cell 10 and supporting the master arm 18 around a shoulder pivot 26 orthogonal to the axis of the part 22, and an overhung part 28 disposed inside the cell 10 and supporting the slave arm 20 via the agency of a shoulder pivot 30 also orthogonal to the horizontal axis of the part 22. The shoulder pivot 30 is normally parallel with the shoulder pivot 26 when there is no offsetting in X between the slave and master arms. The parts 24 and 28 of the traversing block 16 are normally connected to the part 22, but they can be disengaged at the disengagement planes shown diagrammatically at $P_1$ and $P_2$ in FIG. 1, via the agency of disengaging means controlled from outside the cell 10 and familiar to engineers in the art. Such disengaging means do not form part of the invention and will not be described in greater detail. It can simply be noted that they enable the master and slave arms to be changed at will, without affecting the sealing-tightness of the cell.

Also in known manner, each of the arms 18 and 20 is made up of several telescopic parts enabling its length to be modified. Generally three parts are provided, these being shown diagrammatically at 20a, 20b and 20c in the case of the slave arm, the outer part 20a being articulated to the shoulder pivot 30, while the inner part 20c bears the gripper tongs. The intermediate part 20b enables the length of the slave arm to be offset in relation to the master arm. The master arm, which is similar to the slave arm, comprises only two telescopic parts (18a and 18b), ensuring the control of the manual movements. The offsetting of the X, Y and Z movements is controlled by contactors disposed on a handle 34 and controlling step-down gearings which will be described hereinafter.

The inner part of the master arm 18 bears at its lower end a knuckle joint 32 which supports the control handle 34. The knuckle joint 32 is mounted to rotate around the axis of the arm 18, as indicated by arrow A in FIG. 1. Moreover, the knuckle joint 32 is designed on the one hand to enable the handle 34 to be oriented around an axis orthogonal to the axis of the arm 18, as indicated by arrow B, and on the other hand to enable the handle 34 to rotate around its own axis, as indicated by arrow C. The handle 34 also has a trigger allowing the control of the opening and closure of gripper tongs 40 mounted at the lower end of the part 20c of the slave arm, via the agency of a knuckle joint 38 of the same design as the knuckle joint 32.

In the same way as the knuckle joint 32, the knuckle joint 38 can rotate around the axis of the arm 20, as indicated by arrow A, and enables the tongs 40 to make movements in the directions B and C identical with those defined in the case of the handle 34 in relation to the knuckle joint 32.

The preceding description shows that each of the arms of the telemanipulator 14 defines three degrees of positioning freedom determining the positioning of the end of each of the arms in space, and three degrees of orientation freedom, determining the orientation of the handle and of the tongs in relation to such position.

The degrees of positioning freedom are defined as follows:

X: rotational movement of the arms around the horizontal axis of the traversing block 16;
Y: pivoting movement of the arms around their shoulder pivots;
Z: changes in the lengths of the arms.

The degrees of orientation freedom comprise:

A: pivoting movement of the knuckle joint around the axis of the arms;
B. pivoting movement of the handle or of the tongs around an axis orthogonal to the axis of the arms;
C: pivoting movement of the handle or of the tongs around their own axis.

To these movements are added the opening or closure movement of the tongs.

Of course, to perform its function the telemanipulator 14 must be so designed that to each movement the master arm 18 and/or of the control handle 34 there corresponds an identical or similar movement of the slave arm 20 and/or of the gripper tongs 40. To this end, movement-transmitting means are used which are familiar to engineers in the art and which allow the mechanical connection, via the traversing block 16, of the master arm 18 to the slave arm 20, and the handle 34 to the gripper tongs 40.

More precisely, to each of the degrees of positioning and orientation freedom, defined hereinbefore, there corresponds a movement-transmitting means which is made up on the one hand, inside each of the arms 18 and 20, by cable and belt controls and, on the other hand, inside the traversing block 16, by horizontally disposed rotary shafts whose rotation ensures the mechanical transmission to the cables or belts of the slave arm 20, movements imparted to the corresponding cables or belts of the master arm 18. The transmission of the movement between the cables and rotary shafts is performed via the agency of shafts orthogonal to the rotary shafts and simultaneously bearing a capstan, on which the corresponding cable or belt is wound, and a pinion, which meshes with a corresponding pinion borne by the rotary shaft. This method ensures satisfactory sealing-tightness at the part 22 of the traversing block 16 and facilitates the disengagement of the parts 24 and 28. This technique is familiar and will not be described in greater detail here. All that need be remembered, in order to understand the invention properly, is that to each of the degrees of freedom defined by the manipulator 14, except the movement X, and also to the clamping movement of the tongs there corresponds, inside the traversing block 16, a rotary shaft from which movement can easily be picked up by means of a pinion or any equivalent system.

To enhance facility of manipulation in the less accessible zones of the cell 10, the telemanipulator 14 also has in known manner means enabling the slave arm 20 to be offset in relation to the master arm 18. Such offsetting consists in modifying the positioning of the end of the arm 20 bearing the tongs 40, without the end of the master arm 18 bearing the handle 34 being displaced. It therefore applies to each of the degrees of positioning freedom X, Y and Z. In practice the offsetting is generally performed by means of three electric controls corresponding to each of these degrees of freedom. More precisely, a step-down gearing 44 mounted on the part 24 of the block 16 directly controls the angular offsetting in X of the slave arm 20 in relation to the master arm 18. To this end the part 24 of the traversing block is made in two pieces 24b and 24c adapted to rotate in relation to one another when the step-down gearing 44 is operated, to control the angular offsetting in X of the parts 28, 22 and 24b of the block in relation to the part 24c bearing the shoulder pivot 26 of the master arm. A step-down gearing 46 acts by means which will be disclosed hereinafter, so as to control the angular offsetting in Y of the slave arm in relation to the master arm. Lastly, a third step-down gearing 48 enables the length Z of the slave arm to be modified without modifying the length of the master arm, by means which will also be disclosed hereinafter.

Given the dimensions and weights coming into play in this type of telemanipulator 14, it is clearly necessary to obtain as complete an equilibration as possible of the master and slave arms. Such each equilibration must take account of the movements X, Y and Z corresponding to the degrees of positioning freedom of the arms. As already stated, such equilibration is all that the more difficult to achieve in that the corresponding systems must be displaced as far as possible outside the cell, and the possible existence of offsetting between the slave and master arms considerably complicates the problem as regards the equilibration of the slave arm.

The equilibration means suggested according to the invention will now be described in greater detail, with reference to FIGS. 2 to 5.

These means first of all comprise in known manner equilibration means for the master arm. Thus, it can be seen inter alia in FIG. 5 that the upper part 18a of the master arm 18 is prolonged beyond the shoulder pivot 26 in the form of two links 116 bearing a counterweight 118. The weight of the counterweight and the distance separating it from the shoulder pivot 26 are so calculated that it permanently equilibrates the master arm 18 in combination with a second counterweight (not shown) mounted to move on the master arm 18 so as to compensate the displacements in Z of the latter. The latter counterweight is well known to engineers in the art and will not be described here in detail. It should simply be remembered that it moves outside the master arm 18 and is connected to a carriage which allows compensation of the variation in length of the cables during the Z movement of the arm. Thus, this counterweight approaches the shoulder pivot 26 when the master arm is lengthened, and vice versa, so that the mass to be equilibrated by the counterweight 118 is constant.

The means for equilibrating the slave arm according to the invention comprise a first pair of counterweights 60 ensuring the equilibration of the slave arm, taking into account the movements in X and Y controlled by the master arm and electrically controlled offsettings in X, Y and Z, and a second pair of counterweights 120 ensuring the equilibration of the slave arm, taking into account the movement in X, Y and Z controlled by the master arm and the electrically controlled offsetting in Y.

The means controlling the displacements of the counterweights 60 to take these various movements and offsettings of the slave arm into account will now be described with reference to FIGS. 2 and 3.

Figure 2:
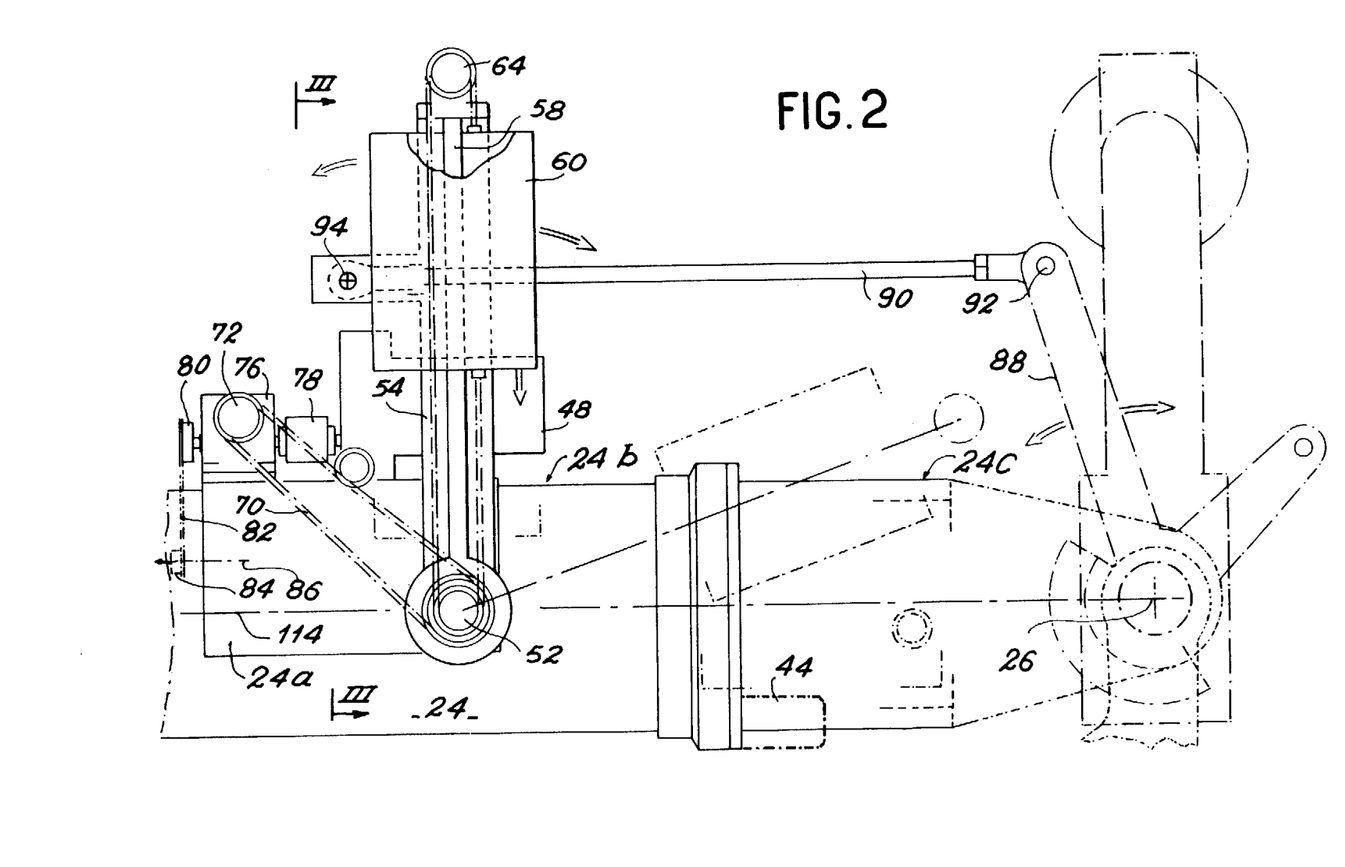
FIG. 2 shows to an enlarged scale the part of the traversing block disposed outside the cell and supporting the master arm.
Figure 3:
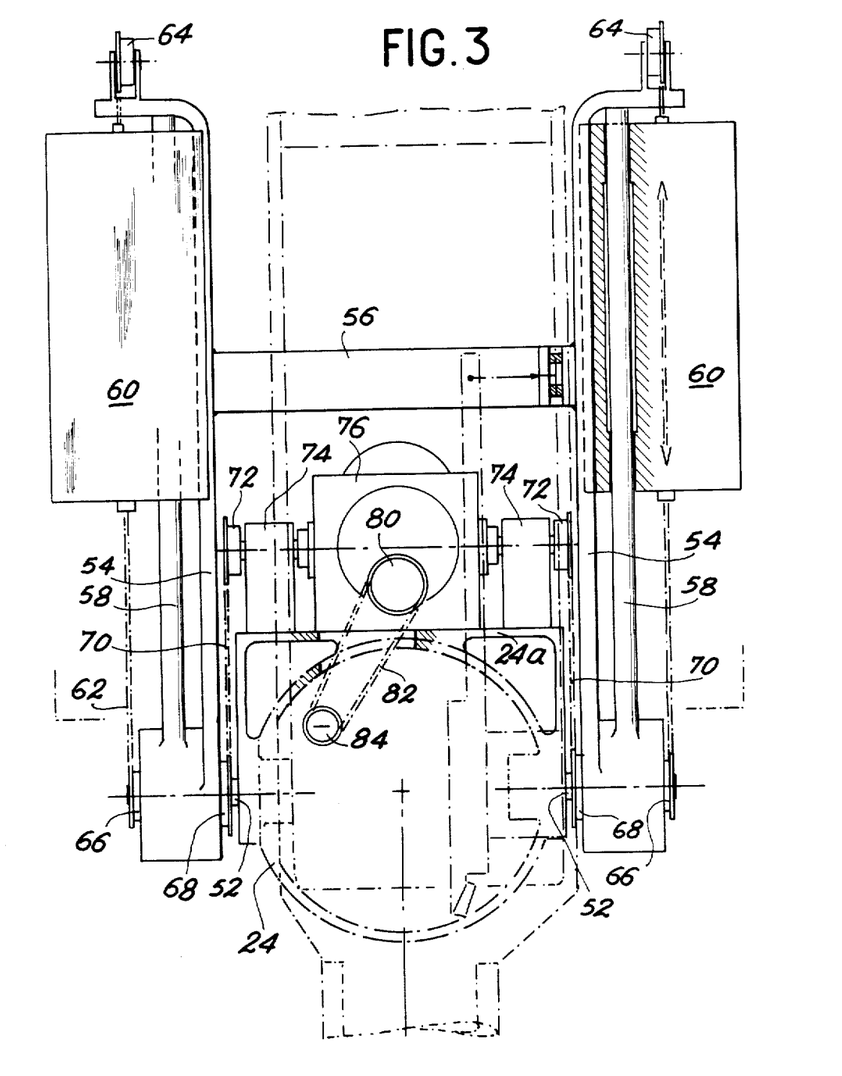
FIG. 3 is a sectional view, taken along the line III—III in FIG. 2, showing more particularly the counterweights ensuring the equilibration of the X and Y movements of the slave arm and rendered mobile according to the invention so as to compensate any offsetting in Z of the slave arm in relation to the master arm.

Thus, in FIGS. 2 and 3 we see that the part 24b of the traversing block 16 bears on either side a pivot 52 parallel with the shoulder pivot 26 of the master arm when there is no offsetting in X. The pivots 52 are disposed in the continuation of one another and intersect the access of the traversing block. Each of the pivots 52 supports rotatably a link 54 which extends above the traversing block 16 oppositely to the master and slave arms, as shown in the drawings. The links 54 are rigidly interconnected by a rod 56 straddling the part 24b of the traversing block. Each of the links 54 comprises a guide rod 58 along which one of the counterweights 60 can slide. Each of the counterweights 60 is attached to the two ends of a chain 62 which meshes with a toothed pinion 64 mounted freely at the end of the corresponding link 54, and with a driving pinion 66 mounted to rotate on the pivot 52, so that a rotation of the pinion 66 results in a displacement of the counterweight 60 along the corresponding guide rod 58. Clearly, the arrangement of the pivot 52 on the part 24b adjacent the step-down gearing 48 controlling the offsetting in Z of the slave arm is particularly advantageous, since it enables the slave arm and the counterweights to be readily controlled by means of this same step-down gearing.

Each of the pinions 66 is connected to a pinion 68 also mounted on the pivot 52 and disposed between the part 24 of the traversing block and corresponding link 54. A chain 70 meshes with each of the toothed wheels 68 and with a second toothed wheel 72 whose pivot, parallel with the corresponding pivot 52, is mounted to rotate in a support 74 attached to a support 24a formed on the part 24b of the traversing block. The pivots supporting each of the toothed wheels 74 are both rotated by a step-down device with wheels and endless screws 76 attached to the support 24.

In a variant embodiment which is not shown the counterweights 60 are displaced by a screw-and-nut system. In that case the pinions 66 are replaced by conical pins which mesh with other conical pinions connected to the corresponding rod 58. Moreover, the rod is screwthreaded and co-operates with a tapping formed in the counterweight, so that its rotation displaces the latter.

As illustrated more particularly in FIG. 2, the step-down device 76 is driven by the step-down gearing 48 ensuring the electrical control of the offsetting in Z of the slave arm in relation to the master arm, via the agency of a coupling. To this end the step-down gearing 48 is also attached to the support 24, between the links 54. The control of the offsetting in Z is performed via the agency of a third output pinion 80 of the step-down device 76 and a chain 82 which meshes simultaneously with the pinion 80 and a pinion 84 connected to the rotary shaft transmitting to the master arm 20 the offsetting in Z controlled by the step-down gearing 48. This rotary shaft is shown diagrammatically at a place 86 in FIG. 2.

As a result of the structure just described, clearly the electric control information of the offsetting in Z of the slave arm in relation to the master arm is so transmitted to the counterweights 60 as to move them upwards or downwards along the guide rods 58, in dependence on the amplitude and the direction of offsetting movement controlled by the step-down gearing 48. More precisely, the amplitude of displacement of the counterweights 60 is proportional to the amplitude of the controlled offsetting. Moreover, the mounting of the links 54 on the part 24b of the traversing block enables the counterweights 60 to follow the movements in X of the slave arm, whether they result from the action of the step-down gearing 44 or the displacement of the master arm.

Moreover, means are provided for transmitting to the links 54 supporting the counterweights 60 the displacements in Y of the master arm. More precisely, what is transmitted to the links 54 bearing the counterweights 60 are the displacements in Y of the master arm 18 and also the offsettings in Y of the slave arm in relation to the master arm, so that the links 54 remain constantly parallel with the slave arm 20 when there is no offsetting in X between the two arms, and substantially parallel with the slave arm when there is such an offsetting. The movements in Y of the slave arm are therefore transmitted in full to the links 54, whether they result from a manual control of the slave arm or from an electric offsetting control of the slave arm in relation to the master arm. It will be noted that the means just described also enable the equilibrating forces resulting from the presence of the counterweights 60 to be transmitted to the slave arm.

Figure 4:
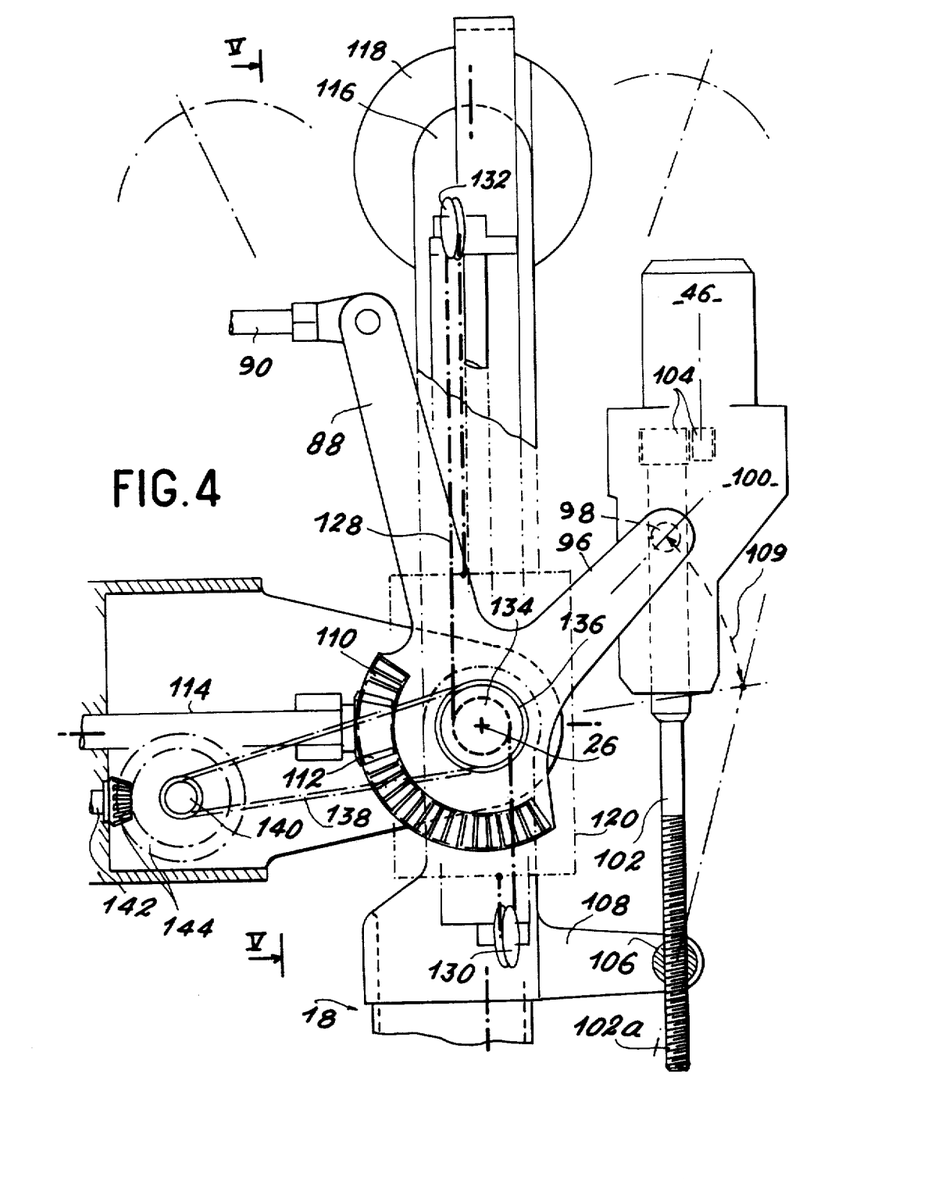
FIG. 4 is a view similar to FIG. 2, showing to an even larger scale the articulation of the master arm at the end of the traversing block and also the means enabling an offsetting in Y between the slave and master arms to be controlled.

As shown mainly in FIGS. 2 and 4, these means comprise a lever arm 88 mounted to pivot around the shoulder pivot 26, and a transmission tie-rod 90 articulated on the one hand to the end of the lever arm 88 opposite the shoulder pivot, and on the other hand to the bar 56 connecting the links 54, so that the swivels 92 and 94 articulating the tie-rod 90 to the lever arm 88 and the connecting rod 56 define a parallelogram with the pivots 26 and 52. It should be noted that the tie-rod 90 is articulated to the lever 88 and the rod 56 via the agency of swivels 92 and 94, since there is an angular offsetting between the parts 24b and 24c of the traversing block when the step-down gearing 44 is actuated (offsetting in X). There is then a slight annular offsetting as a result between the links 54 and the slave arm, which corresponds to a defect of equilibration of the second order, which can readily be tolerated. As shown in FIG. 4, the lever arm 88 is connected to a second lever arm 96 whose end remote from the shoulder pivot 26 is articulated via a pivot 98 to a casing 100 bearing the step-down gearing 46 controlling the offsetting in Y of the slave arm in relation to the master arm. A rod 102 is rotatably mounted in the casing 100 so as to be rotated by the step-down gearing 46 via the agency of a set of gears 104. The rod 102 projects downwards in the position of the master arm 18 shown in the drawing, and has at its lower end a screwthreaded part 102a which is fixed in a nut 106 rotatably mounted in an arm 108 attached to the master arm 18, adjacent its shoulder pivot 26.

In a variant which is not shown, this arrangement can be reversed. Then the casing of the step-down transmission 46 is borne pivotably at the end of a lever arm connected to the master arm above the shoulder pivot, and the nut 106 in which the rod 102 is screwed is rotatably mounted at the end of the lever arm 96.

Clearly, as a result of this arrangement any pivoting of the master arm 18 around its shoulder pivot in the direction Y is transmitted in full to the lever arm 88 via the agency of the rigid connection formed by the arm 108, the rod 102 and the lever arm 96. The tie-rod 90 therefore transmits to the links 54 in full the angle of rotation of the master arm 18 around its shoulder pivot 26. Since such pivoting movement is moreover transmitted in full to the slave arm 20 as already described, the inclination of the links 54 bearing the counterweights 60 is therefore the same as that of the arm 20 when a displacement in Y of the latter is manually controlled by means of the master arm 18, except for the error due to any offsetting in X.

Moveover, it can be seen that the operation of the step-down gearing 46 leads as a result of the co-operation between the screwthreaded part 102a and the nut 106 to a modification of the distance separating to pivot 98 from the nut 106, and therefore to the pivoting of the lever arm 96 around the shoulder pivot 26, as illustrated by arrow 109 in FIG. 4. To this pivoting there corresponds a pivoting of the lever arm 88. The inclination of the links 54 is therefore modified by an angle equal to and in the same direction of that by which the lever arm 96 is displaced by the action of the step-down gearing 46.

As shown more particularly in FIG. 4, the member bearing the lever arms 88 and 96 also transmits to the slave arm the displacements in Y resulting either from a displacement of the master arm 18, or from the operation of the step-down gearing 46. To this end such member has a toothed sector 110 which is centered on the shoulder pivot 26 and with which a pinion 112 meshes which is connected to a rotary shaft 114 transmitting via the traversing block 16 such movements in Y to the slave arm 20 (FIG. 1).

Clearly, the resulting mechanical connection between the shaft 114 and the links 54 bearing the counterweights 60 also enables the equilibrating force exerted by the latter to be transmitted to the slave arm.

Preferably, according to another feature of the invention, the counterweights 60 have accompanying them counterweights 120 which in practice perform the same function, while taking into account variations in the elongation Z of the slave arm which are manually controlled by means of the master arm.

Figure 5:
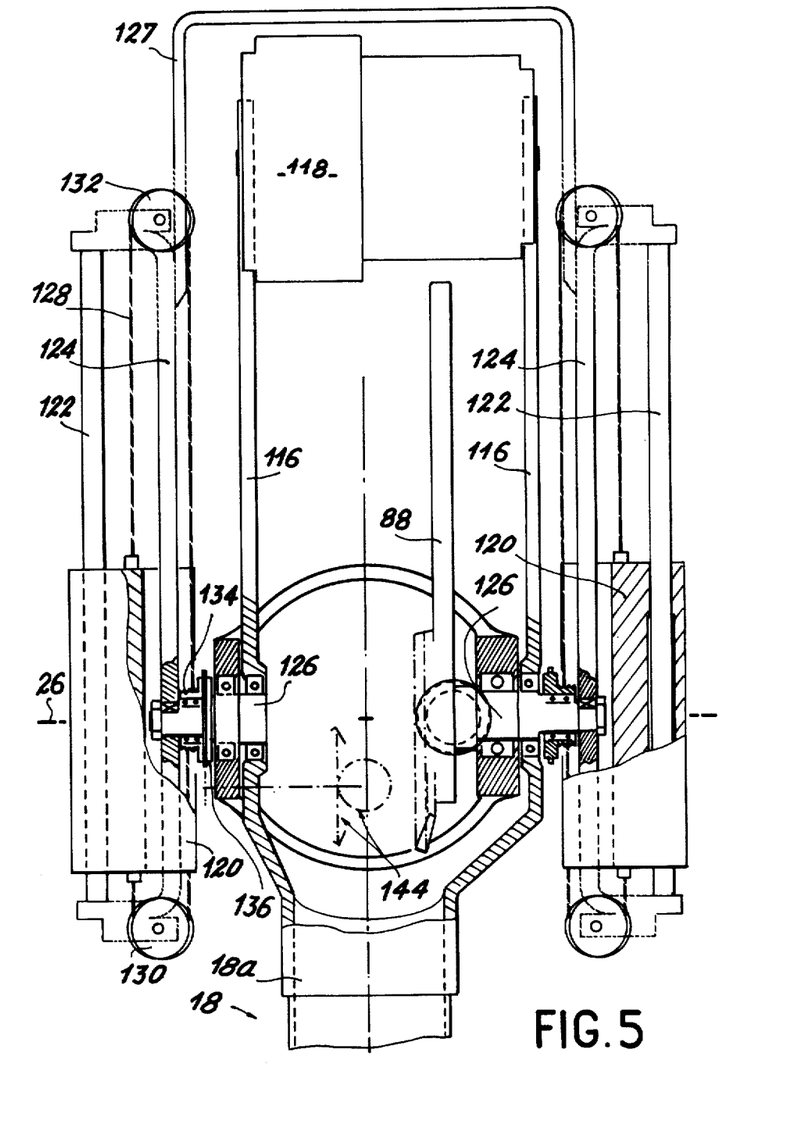
FIG. 5 is a view, sectioned along the line V—V in FIG. 4, showing more particularly the counterweight for equilibration in X and Y of the master arm, and the counterweights according to the invention enabling the slave arm to be equilibrated in X and Y when it is subjected to a movement Z manually controlled by means of a comparable movement of the master arm.

As shown more particularly by FIGS. 4 and 5, this latter function is performed by disposing the counterweights 120 on either side of the part 24 of the traversing block, at the level of the shoulder pivot 26. More precisely, each counterweight 120 is slidably received on a guide rod 122 of a link 124. Each of the links 124 is connected for corotation to a pivot 126 centred on the shoulder pivot 26 and mounted to rotate at one and the same time in relation to the part 24 and in relation to the part 18 of the master arm. The links 124 are connected by a connecting rod 127 overhanging the counterweight 118, as shown in FIG. 5, so as to enable this counterweight to pass between the links 124. One of the pivots 126 is connected to the member 110 supporting inter alia the lever arms 88 and 96, so that the displacements in Y of the slave arm, whether manual or electric, are also transmitted to the links 124. The latter therefore remain always parallel with the links 54 supporting the counterweights 60. In other words, the links 124 pivot around the shoulder pivot 26 by an angle equal to and in the same direction as the pivoting angle of the slave arm around its shoulder pivot, the links 124 remaining always parallel with the slave arm when there is no offsetting in X between the slave and master arms.

In order to complete the equilibration achieved by means of the counterweights 60, to take into account the variations Z in the length of the slave arm which are controlled manually by modifying the length of the master arm, the counterweights 200 move along the links 124. This result is obtained by attaching to each of the counterweights 120 the ends of a cable 128 received in loose pulleys 130 and 132 mounted at the upper and lower ends of the corresponding link 124. Moreover, each of the cables 128 is wound on a driving pulley 134 rotatably received on the corresponding pivot 126, between the link 124 and the part 24 of the traversing block. Each of the pulleys 134 is connected to a pinion 136 with which a chain 138 meshes which is driven by a second pinion 140, whose pivot, parallel with the shoulder pivot 26, is itself rotated by a rotary shaft 142 via the agency of angle-return pinions 144. It can be seen that the articulation of the links 124 around the shoulder pivot 26 thus enables the offsetting in Z of the slave arm and the corresponding displacement of the counterweights 120 to be readily controlled simultaneously.

In a variant which is not shown, the chain 138 can be eliminated. In that case the pinion 140 is replaced by a capstan on which one of the cables 128 is wound after passing over the pulley 134. Since the rotary shaft 142 is the shaft by which the variations in the elongation Z of the master arm 18 are transmitted to the slave arm 20 via the traversing block 22, the mechanism just described of course enables the counterweights 120 to be displaced along the links 124 by a distance proportional to the variation in elongation Z thus transmitted. Since the links 124 bearing the counterweights 120 engage directly with the shaft 114 transmitting the electric and manual movements Y to the slave arm, clearly the result is an equilibration of the slave arm which is combined with that obtained by means of the counterweights 60, to perfectly equilibrate the slave arm when no offsetting in X is controlled by means of the step-down gearing 44. Moreover, the equilibrating means just described remain relatively simple, so that the price and reliability of the telemanipulator according to the invention are perfectly satisfactory.

Of course, the invention is not limited to the embodiment disclosed hereinbefore by way of example, but covers all variants. It will therefore easily be understood that the pivoting axes of the links supporting the equilibrating counterweights of the slave arm on the part of the traversing block supporting the master arm can be differently located than in the way described. For example, the links 124 bearing the counterweights 120 might be mounted to pivot on a pivot parallel with the shoulder pivot, and inter alia the counterweights 60 and the counterweights 120 might conceivably be reversed. However, it should be noted that for obvious reasons of the space occupied, it is preferable for at least one of these equilibrating systems to be articulated directly around the shoulder pivot, the arrangement described being the one which most readily ensures the pick-up of the movements in Z of the slave arm. On the other hand it will be understood that the mechanical transmission systems by cables and pulleys or by chains and pinions which have been described can be replaced by any equivalent mechanism. Lastly, each movement of the slave arm might be compensated by a single counterweight, and not by two counterweights disposed symmetrically in relation to the traversing block, on condition that the movement of such counterweight would not excessively reduce the range of the telemanipulator. With this in mind, inter alia the pivoting axis of the links bearing the counterweight might be offset in relation to the axis of rotation of the traversing block, so as to keep the movement of the counterweight at an acceptable value.

What is claimed is:

1. A telescopic telemanipulator comprising: A traversing block which traverses a compartment and which is mounted to rotate around its own axis; a telescopic master arm and a telescopic slave arm, such arms being articulated to the traversing block around two shoulder pivots orthogonal to the axis of the block; a control handle mounted at the free end of the master arm; a gripper member mounted at the free end of the slave arm; means for transmitting to the slave arm and the gripper member movements imparted to the master arm and the control handle; means for offsetting the slave arm in relation to the master arm, enabling the length and orientation of the slave arm around its shoulder pivot to be modified without modifying the corresponding coordinates of the master arm; and means for equilibrating the master arm and means for equilibrating the slave arm, wherein the means for equilibrating the slave arm comprise at least a first counterweight mounted on a first link articulated to the traversing block on the master arm side and in the opposite direction in relation to said master arm around a pivot parallel with the shoulder pivot of the master arm, means for displacing the first counterweight along the first link, said means for offsetting the length of the slave arm in relation to the length of the master arm simultaneously actuating said means for displacing the first counterweight and at least a second counterweight mounted on a second link articuluated to the traversing block on the master arm side and in the opposite direction in relation to said master arm around a pivot parallel with the shoulder pivot of the master arm, means for displacing the second counterweight along said second link, said means for transmitting to the slave arm any modification in the length of the master arm simultaneously actuating said means for displacing the second counterweight.

2. A telemanipulator according to claim 1, futher comprising means for offsetting the slave arm in relation to the master arm around the axis of the traversing block, these means being disposed on the master arm side and act between a first part of the traversing block, bearing the shoulder pivot of the master arm, and a second part of the traversing block, bearing the shoulder pivot of the slave arm, the link bearing the first counterweight being articulated to the second part, and the link bearing the second counterweight being articulated to the first part.

3. A telemanipulator according to claim 2, further comprising means for pivoting simultaneously said first and second links around their axis by an angle equal to and in the same direction as the pivoting angle of the slave arm around its shoulder pivot when the transmission means and the offsetting means act on the slave arm to pivot it around its shoulder pivot, the means for pivoting the links ensuring in return the transmission to the slave arm of the equilibrating effect caused by said counterweights.

4. A telemanipulator according to claim 3, wherein the means for transmitting to the slave arm a pivoting movement of the master arm around its shoulder pivot comprise a rotary shaft received in the traversing block and rotated by a toothed sector formed on a member mounted to rotate on the shoulder pivot of the master arm, such member being connected to the master arm via the means for controlling the angular offsetting of the slave arm around its shoulder pivot.

5. A telemanipulator according to claim 4, wherein the link bearing the second counterweight is articulated around an axis coinciding with the shoulder pivot of the master arm, the means for pivoting the links comprising a pivot connected to the second link and to said member mounted to rotate on the shoulder pivot of the master arm, and a tie-rod articulated simultaneously to the first link and to a lever arm formed on such member.

6. A telemanipulator according to claim 1, wherein said means for transmitting to the slave arm any modification in the length of the master arm comprise a rotary shaft actuating said means for displacing the second counterweight along the second link.

7. A telemanipulator according to claim 6, wherein the rotary shaft serving to transmit to the slave arm any modification in the length of the master arm controls the displacement of the second counterweight along the link via the agency of a transmission, of the gear wheel and chain type, between such shaft and the pivot via which the link is articulated to the traversing block, and the means for displacing the second counterweight along the link.

8. A telemanipulator according to claim 1, wherein the means for the lengthwise offsetting of the slave arm comprise a step-down gearing mounted on the traversing block on the master arm side, the step-down gearing simultaneously controlling the lengthwise offsetting of the slave arm via the agency of a rotary shaft received in such block and the displacement of the first counterweight along the link via the agency of a first transmission, of the gear wheel and chain type, between the step-down gearing and the pivot of articulation of the link to the traversing block, and the means for displacing the first counterweight along the link.

* * * * *

UNITED STATES PATENT AND TRADEMARK OFFICE
CERTIFICATE OF CORRECTION

PATENT NO. : 4,493,598
DATED : January 15, 1985
INVENTOR(S) : Charles Glachet; Daniel Francois, Jean Tentelier, Christian Frioux It is certified that error appears in the above—identified patent and that said Letters Patent is hereby corrected as shown below:

IN THE CLAIMS

Claim 2, Column 12, line 54, "futher" should read as "further".

Signed and Sealed this

Fourteenth Day of May 1985

[SEAL]

Attest:

DONALD J. QUIGG

Attesting Officer     Acting Commissioner of Patents and Trademarks